Patented Nov. 18, 1947

2,430,926

UNITED STATES PATENT OFFICE 2,430,926

CELLULOSE ESTER PLASTICS

Rudolph Max Goepp, Jr., New Castle, Del., assignor to Atlas Powder Company, Wilmington, Del., a corporation of Delaware No Drawing. Application October 9, 1944,
Serial No. 557,940

11 Claims. (Cl. 106—176)

The present invention relates to improvements in cellulose ester plastics.

An object of the invention is to provide new and useful plastic compositions of esters of cellulose and saturated straight chain fatty acids with from 2 to 4 carbon atoms.

Other objects will become apparent in the course of the following description.

In accordance with the present invention, it has been found that cellulose esters of saturated straight chain fatty acids with from 2 to 4 carbon atoms, for example cellulose acetate, cellulose propionate, cellulose acetate butyrate, etc., can be plasticized to yield useful compositions by incorporating with them a ketal of a hexitol and a chlorine substituted acetone which ketal has not more than two free hydroxyl groups. Examples of the hexitol ketals of this class are sorbitol di-ketal of monochloroacetone, mannitol di-ketal of monochloracetone, sorbitol tri-ketal of monochloroacetone, sorbitol di-ketal of dichloroacetone, mannitol tri-ketal of dichloroacetone, sorbitol of di-ketal of tetra-chloroacetone, etc. In place of sorbitol and mannitol, any of the other isomeric hexitols may be used. Because of the availability of monochloroacetone and the ease with which the di-condensation products are prepared, the hexitol di-ketals of monochloroacetone are the preferred compounds for use in the invention. These condensation products are compatible with the cellulose esters over a wide range of proportions, are resistant to hydrolysis and have low volatilities. In addition to these properties, the ketals of chloroacetones act as fireproofing agents in the cellulose plastics. Compositions of cellulose esters and the hexitol ketals of chloroacetones exhibit high tensile strength and the desirable plastic properties of flexibility and extensibility. Compositions of the cellulose ester and the hexitol ketal chloroacetone are suitable for use in the preparation of coating compositions, sheets, filaments, formed bodies, molding compositions, and the like. In connection with these products, the compositions may be mixed with coloring agents, pigments, fillers, or other modifying agents as well understood in the plastic art.

The hexitol ketals of chloroacetone used in this invention can be made by directly reacting the hexitol with the selected chloroacetone, preferably in the presence of an acidic catalyst such as sulfuric acid, hydrochloric acid or p-toluene sulfonic acid. Since the reaction liberates water, it is advantageous to remove the water as it is formed to permit the reaction to go to completion. For this purpose, the reaction can be performed using an excess of the chloroacetone or adding an inert liquid, such as toluene, to form a constant boiling mixture with the water and facilitate its removal. The product of this reaction is a mixture of two or more hexitol ketals of the chloroacetone. By selection of ingredient proportions, catalyst, temperature and time, a particular product can be made the principal constituent of the mixture. If desired, the mixed product can be fractionated, as by distillation, but the mixture is suitable for use as such to prepare the cellulose ester compositions of this invention. The following examples are illustrative of the process just described.

Example 1

258 grams sorbitol solution in water containing 182 grams sorbitol (dry basis), 350 ml. (about 4.35 mols) monochloroacetone, 350 ml. toluene and 20 ml. concentrated hydrochloric acid were placed in a flask and heated at refluxing temperature for 1½ hours. The temperature was allowed to rise to 111° C. during this time. The apparatus was such that the toluene azeotrope was taken off, condensed, separated and the toluene returned to the reactor. The course of the reaction was followed by observing the quantity of water evolved and collected. The catalyst was then neutralized, the product washed with water and the toluene distilled off, leaving the crude sorbitol ketal of chloroacetone. The crude product was distilled at a pressure of 1 cm. mercury and the distillate obtained in the range 160 to 220° C. was collected. The distillate was a viscous, straw-colored liquid which was found on analysis to be principally sorbitol di-ketal of monochloroacetone.

Example 2

191 grams sorbitol (1.05 mols), 740 grams monochloroacetone (about 8 mols) and 1 ml. concentrated sulfuric acid were reacted as in Example 1, the water of reaction distilling off with the excess monochloroacetone. Reaction was continued until 58 grams water had been collected. The catalyst was neutralized, the product washed with water, and the excess monochloroacetone removed by distillation. The crude reaction product was distilled at a pressure of 6 mm. mercury and the fraction collected at 230 to 245° C. retained. This product was a mixture of sorbitol di- and tri-ketals of monochloroacetone in which the former predominated.

The other hexitol ketals of chloroacetones can be prepared by analogous processes.

The plastic compositions of the invention can be made by combining the cellulose ester and the hexitol ketal of chloroacetone by the usual compounding methods such as by milling the ingredients together or by dissolving them in mutual solvents. The particular proportions employed will depend largely on the characteristics desired in the plastic. Instead of using a single one of the hexitol ketals of chloroacetone, two or more may be employed together or one or more of them can be used in conjunction with conventional plasticizers for certain purposes.

The following examples illustrate particular plastic compositions of the invention.

Example 3

A stock solution was prepared of cellulose acetate (52% acetyl), 16.65 grams of a solvent mixture composed of acetone 20.85 grams, cyclohexanone 20.85 grams, ethyl acetate 16.65 grams, ethyl lactate 12.53 grams, and toluol 12.53 grams. 2.77 grams of sorbitol di-ketal of monochloroacetone were dissolved in 50 parts of this stock solution. The resulting solution was then cast on a glass plate by means of a doctor blade adjusted so that the film had a wet thickness of 0.03 inch. The plate and film were dried at 25° C. over night and were then dried at 110° C. for one hour. Following this drying, the films now composed of cellulose acetate plus 33⅓% of the sorbitol diketal of monochloroacetone were stripped off the plate and cut into strips one-half inch wide. Tensile strength and elongation measurements were then made on the plasticized strips. The strips were found to have an average tensile strength of 6,100 pounds per square inch and an average maximum elongation of 50%.

It was independently determined that sorbitol di-ketone of monochloroacetone was compatible with this cellulose acetate to the extent of 100%.

Example 4

A stock solution was made up as in Example 3 but cellulose acetate butyrate was substituted for the cellulose acetate of the preceding example. Plasticized strips for testing were prepared as in Example 3 to contain 33⅓% sorbitol di-ketone of monochloroacetone. In the tests of these strips, the average tensile strength was found to be 5,600 pounds per square inch and the average maximum elongation was found to be 65%.

Other combinations of the cellulose esters and hexitol chloroacetone of the classes defined can be made in a similar manner, the last two examples being merely illustrative of two of the plastic compositions of this invention.

What is claimed is:

1. A plastic composition comprising a cellulose ester of a saturated straight-chain fatty acid with from 2 to 4 carbon atoms and as a plasticizer therefor a hexitol ketal of a chloroacetone with not more than 2 free hydroxyl groups.

2. A plastic composition comprising a cellulose ester of a saturated straight-chain fatty acid with from 2 to 4 carbon atoms and as a plasticizer therefor a mannitol ketal of a chloroacetone with not more than 2 free hydroxyl groups.

3. A plastic composition comprising a cellulose ester of a saturated straight-chain fatty acid with from 2 to 4 carbon atoms and as a plasticizer therefor a sorbitol ketal of a chloroacetone with not more than 2 free hydroxyl groups.

4. A plastic composition comprising a cellulose ester of a saturated straight-chain fatty acid with from 2 to 4 carbon atoms and as a plasticizer therefor a hexitol di-ketal of monochloroacetone.

5. A plastic composition comprising a cellulose ester of a saturated straight-chain fatty acid with from 2 to 4 carbon atoms and as a plasticizer therefor a mannitol di-ketal of monochloroacetone.

6. A plastic composition comprising a cellulose ester of a saturated straight-chain fatty acid with from 2 to 4 carbon atoms and as a plasticizer therefor a sorbitol di-ketal of monochloroacetone.

7. A plastic composition comprising cellulose acetate and as a plasticizer therefor a hexitol ketal of a chloroacetone with not more than 2 free hydroxyl groups.

8. A plastic composition comprising cellulose acetate and as a plasticizer therefor a hexitol di-ketal of monochloroacetone.

9. A plastic composition comprising cellulose acetate and as a plasticizer therefor a sorbitol di-ketal of monochloroacetone.

10. A plastic composition comprising cellulose acetate butyrate and as a plasticizer therefor a hexitol ketal of a chloroacetone with not more than two free hydroxyl groups.

11. A plastic composition comprising cellulose acetate butyrate and as a plasticizer therefor a hexitol di-ketal of monochloroacetone.

RUDOLPH MAX GOEPP, Jr.

REFERENCES CITED

The following references are of record in the file of this patent:

UNITED STATES PATENTS

| Number | Name | Date |
|---|---|---|
| 2,355,533 | Holst | Aug. 8, 1944 |
| 2,331,614 | Marple et al. | Oct. 12, 1943 |
| 2,062,406 | Dreyfus | Dec. 1, 1936 |
| 2,025,044 | Dreyfus | Dec. 24, 1935 |
| 996,191 | Ach | June 27, 1911 |

FOREIGN PATENTS

| Number | Country | Date |
|---|---|---|
| 589,732 | France | June 4, 1925 |

OTHER REFERENCES

Page 44 of "The Condensed Chemical Dictionary," by Gregory, 3rd ed. (1942).

Certificate of Correction

Patent No. 2,430,926.　　　　　　　　　　　　　　　　　　November 18, 1947.

RUDOLPH MAX GOEPP, JR.

It is hereby certified that errors appear in the printed specification of the above numbered patent requiring correction as follows: Column 3, line 38, Example 3, and line 46, Example 4, for "di-ketone" read *di-ketal*; line 52, same Example 4, after "hexitol" insert *ketals of*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*